Feb. 11, 1941.  A. W. GRIEPENSTROH  2,231,332
SHOCK ABSORBING STRUT
Filed June 16, 1938

INVENTOR
ARTHUR W. GRIEPENSTROH
BY
ATTORNEY

Patented Feb. 11, 1941

2,231,332

UNITED STATES PATENT OFFICE 2,231,332

SHOCK ABSORBING STRUT

Arthur W. Griepenstroh, Garfield Heights, Ohio, assignor to The Cleveland Pneumatic Tool Company, Cleveland, Ohio, a corporation of Ohio Application June 16, 1938, Serial No. 214,101

2 Claims. (Cl. 267—64)

This invention relates to improvements in shock absorbing struts used particularly in landing gears of aircraft, although features of the invention are also susceptible of application to shock absorbers for use in land vehicles.

One object of this invention is to produce a shock absorbing strut with improved bearing qualities assuring free slidable movements of its telescoping parts in coaxial alignment.

Another object of this invention is the provision in a shock absorbing strut of a fluid tight joint between the telescoping parts of the strut, this jointing being accomplished by expansible packings subjected to pressure conditions within the strut.

Another object of this invention is to produce a shock absorbing strut with means for limiting the slidable movement in one direction of its telescoping parts without subjecting the packing means provided therein to abnormal pressure resulting from the weight of the landing wheel carried by the strut.

Other objects of this invention will be apparent from the following detailed description wherein similar characters of reference designate corresponding parts, and wherein.

Figure 1:
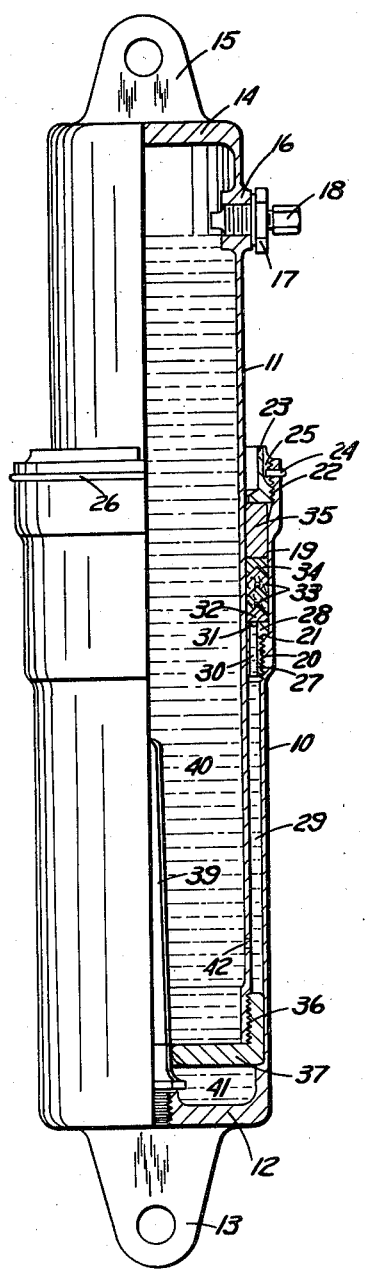
Fig. 1 is a side elevational view partly in section of a shock absorbing strut embodying the invention.

Referring to the drawing, the shock absorber shown includes two telescoping cylinders 10 and 11, 10 being the larger or outer cylinder having its outer end closed as at 12 and provided with a clevis 13 extending therefrom for attachment to the landing gear of the aircraft.

The smaller or inner cylinder 11 has its outer end closed as at 14, and is also provided with a clevis 15 for attachment to the fuselage of the aircraft. Near its outer end, the inner cylinder has its side wall formed with a laterally extending boss 16 having operatively secured therein a filter plug 17 and an air valve 18 through which liquid and compressed air are admitted into the shock absorber for cushioning relative axial movement of the cylinders 10 and 11.

The inner end portion of the outer cylinder 10 is enlarged to form a packing gland or counterbore 19 having its lower end portion 20 reduced in diameter to form an annular shoulder 21, while the upper end portion 22 is enlarged and threaded to receive a gland nut 23 held against accidental rotation by a cross pin 24 extending through the cylinder 10 into one of several grooves 25 formed longitudinally in the gland nut 23. In the present construction, the cross pin 24 constitutes the bent end portion of a spring clip 26 clasping the outer cylinder 10. The inner portion 20 of the counterbore 19 is also threaded to receive a removable bushing 27 having its upper end formed by a head 28 frictionally engaging the annular shoulder 21. In practice, this bushing is preferably made of good bearing material such as bronze or the like, and is accurately machined to form a stationary removable sliding bearing for the inner cylinder 11. The bushing 27 also forms the upper end of an annular chamber 29 existing between the two cylinders 10 and 11 due to the difference in the diameters thereof, which chamber is in communication with the counterbore 19 through one or more small ports 30 provided through the bushing 27 and opening into an annular groove 31 cut in the upper end wall of the bushing.

Resting on the bushing 27, there is a ring or spreader 32 of a cross section shaped substantially as an inverted V and engaging one of several packing rings 33 of similar cross sectional shape. On top of the last packing ring is disposed a cap 34 in the form of a ring fitting over the upper packing ring 33. Resting on the cap 34, there is a short sleeve 35 in close slidable engagement with the inner wall of the counterbore 19, which sleeve is also preferably made of good bearing material such as bronze or the like and is accurately machined to form a sliding bearing for the inner cylinder 11, which bearing together with the cap 34, the packing rings 33 and the spreader 32, is held in position on the bushing 27 by the gland nut 23. In practice, the gland nut 23 is preferably made of steel and does not contact the inner cylinder 11. The packing rings 33 are made of any suitable commercial material which is pliable and compressible to afford a fluid tight joint between the two cylinders.

The inner end of the inner cylinder 11 is externally threaded as at 36 to receive a cup-shaped piston 37 also made of bronze or the like and machined for slidable engagement with the outer cylinder 10. This piston constitutes the lower end of the annular chamber 29, and is formed with a central orifice 38 enabling the free passage of a tapered metering pin 39 carried by the closed end 12 of the outer cylinder and extending upwardly therefrom. The piston 37 divides the interior of the strut in two chambers, one the chamber 40 formed within the inner cylinder, and the other the chamber 41 located between the piston 37 and the closed end 12 of the outer cylinder. The chamber 40 is capable of communication with the annular chamber 29 through one or more ports 42 extending laterally through the inner cylinder 10 at a place near the piston 37.

Figure 2:
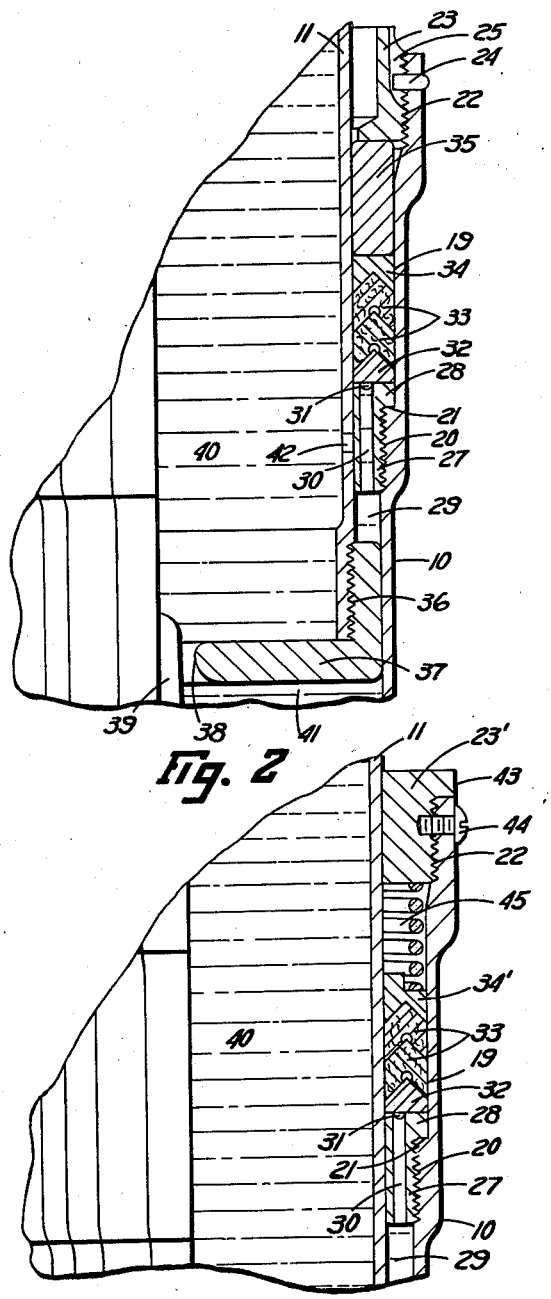
Fig. 2 is an enlarged portional view of the shock absorbing strut shown in Fig. 1 with the inner cylinder shown near the end of its fully extended position.
Figure 3:
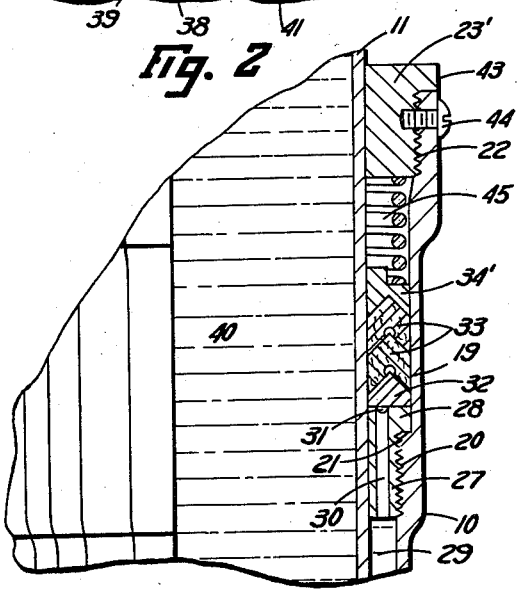
Fig. 3 is a view similar to Fig. 2 showing a modification of the invention.

In the modification shown in Fig. 3, the gland nut 23' is formed with an annular flange 43 engaging the upper end of the outer cylinder 10, and held in position by a set screw 44. This gland nut is also made of bronze or the like, and accurately machined internally to form a sliding bearing for the inner cylinder 11. In this modified construction, the bearing-sleeve 35 in Fig. 2, is replaced by a compression spring 45 interposed between the nut 23' and a cap 34'.

In practice, when the strut assembly is mounted upon an airplane or the like, the two cylinders 10 and 11 will telescope inwardly to assume the position shown in Fig. 1. In this collapsed condition of the strut, liquid such as oil is introduced into the strut by removing the filler plug 17. When the liquid reaches the level of this plug, the plug is again screwed into the boss 16 and compressed air is admitted into the strut through the air valve 18, thereby causing partial expansion of the strut with the weight of the airplane upon it. In this instance, the liquid passing through the orifice 38 fills the chamber 41, while the annular chamber 29 is also filled by liquid flowing through the port 42.

In operation, during landing or taxiing, the forces tending to move the airplane toward its landing gear will also cause inward telescopic movement of the cylinders 10 and 11. This movement of the cylinders is cushioned by the compressed air stored within the upper end of the chamber 40 and by the flow of the liquid from the chamber 41 into the chamber 40 via the orifice 38, the liquid conveying capacity of which is gradually reduced by the tapered metering pin 39.

After landing or while taxiing, the rebound or movement of the airplane away from its landing gear will cause outward telescopic movement of the cylinders 10 and 11, which movement is checked by a partial vacuum condition existing in the chamber 41 below the piston 37, and by the restricted flow of the liquid from the annular chamber 29 into the chamber 40. In this instance, the liquid within the chamber 29 under pressure by the upward movement of the piston 37, will flow through the bushing 27 via the passages 30 to act on the spreader 32, causing it to compress and expand the packing rings 33, hence affording a fluid tight joint between the two cylinders 10 and 11.

During flight, when the weight of the plane is taken off the strut, the weight of the landing wheel supported by the strut together with the action of the compressed air within the upper end of the chamber 40, will cause expansion of the strut until the piston 37 engages the bushing 27. Near the maximum expansion of the strut, the port 42 will pass the bushing 27 and be covered thereby as shown in Fig. 2, thus causing the now short annular chamber 29 to act as a dash-pot for checking the outward telescopic movement of the cylinders 10 and 11, while liquid from the chamber 29 is forced to escape between the piston 37 and the cylinder 10 into the chamber 41. At the end of the expansion of the strut, the piston 37 engaging the stationary bushing 27 will not transmit impacts or pressure on the packing rings 33 resulting from the weight of the landing wheel carried by the strut, thereby enabling the packing rings 33 to normally engage the cylinders 10 and 11 without being subjected to abnormal pressure and fatigue during flight of the plane.

As previously stated with reference to Fig. 2, adequate pressure on the packing rings 33 may be maintained by adjusting the gland nut 23, while in the modification shown in Fig. 3 adequate pressure on the packing rings is maintained by the compression spring 45.

I claim:

1. A shock absorbing strut, including two telescoping cylinders, a chamber within and an annular compartment between said cylinders having liquid stored therein, a piston on the inner end of the inner cylinder forming the lower end of said compartment, a bushing fixed to and within the dimensions of the outer cylinder forming the upper end of said compartment, said bushing being engageable by said piston for limiting the movement of said cylinders in the extending direction, packing means between said cylinders and above said bushing preventing escape of liquid through the inner end of the outer cylinder, and a passageway leading from said compartment to said packing means above said bushing enabling pressure of the liquid within said compartment to react against said packing means.

2. A shock absorbing strut, comprising two telescoping cylinders, an annular chamber between said cylinders having liquid stored therein, a piston on the inner end of the inner cylinder forming one end of said chamber, a removable bushing fixed to and entirely within the inner end portion of the outer cylinder, said bushing forming the other end of said chamber and being engageable by said piston for limiting the movement of said cylinders in the extending direction, packing means between said cylinders and above said bushing for preventing escape of liquid from said chamber to the exterior of said cylinders via the interior or exterior of said bushing, and a port through said removable bushing enabling pressure of the liquid within said annular chamber to react against said packing means.

ARTHUR W. GRIEPENSTROH.